Figure 1:
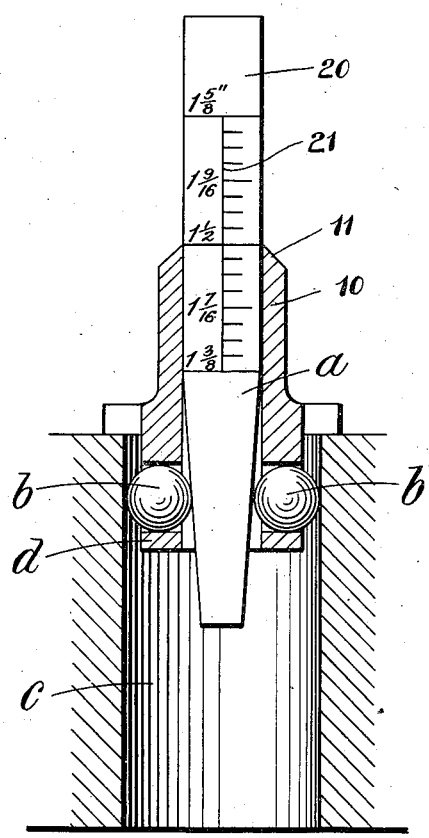

W. B. MAIR.
DIAMETER GAGE.
APPLICATION FILED APR. 5, 1909.

1,008,842.

Patented Nov. 14, 1911.

WITNESSES:

INVENTOR
William Bruce Mair
BY
ATTORNEYS.

UNITED STATES PATENT OFFICE.

WILLIAM BRUCE MAIR, OF SPRINGFIELD, CHELMSFORD, ENGLAND.

DIAMETER-GAGE.

1,008,842.  Specification of Letters Patent.  Patented Nov. 14, 1911.

Application filed April 5, 1909. Serial No. 487,993.

*To all whom it may concern:*

Be it known that I, WILLIAM BRUCE MAIR, a subject of His Majesty the King of England, residing at Springfield, Chelmsford, Essex, England, have invented certain new and useful Improvements in Diameter-Gages, of which the following is a specification.

A standard-gage is usually made so that it is a solid piece of the given diameter which possesses many practical disadvantages in the way of handling, accuracy and general use.

The object of my invention is to obviate these disadvantages in a simple manner, and to this end I employ an instrument comprising a standard-gage in conjunction with a series of balls whereby I obtain lightness, accuracy, ease in handling, and, in addition, collapsibility thereby rendering one instrument capable of very varied use.

According to one form of my invention, therefore, in an instrument for gaging the diameter of holes, I adopt a plug gage of considerably smaller diameter than the hole and arrange a series of balls in the annular space between the periphery of the gage and the face of the hole. For example, an instrument for gaging a hole of $2\frac{1}{4}''$ diameter may consist of a plug gage $\frac{3}{4}''$ diameter and a series of balls $\frac{3}{4}''$ diameter situated in the annular space between the plug gage and the hole. By using standard balls, which are easily procurable, an accurate measurement can be effected. When an ordinary plug gage is used as at present it requires considerable skill to use it without causing damage, but by the combination of a small plug and balls the touch necessary for the introduction of the plug gage is so light and the piece to handle so light that the gaging of a hole can be done with the greatest ease and without exertion.

The gaging of an outside diameter by the use of balls interposed in an annular space between the female gage and the article to be measured can be dealt with quite as easily, for, although the hole in the gage is now larger than the piece to be measured, the exertion necessary for the application of the gage with the annular space occupied by balls is extremely light in comparison with the usual method. One standard size of gage can also be used for a large variety of holes as the annular space may be of such size as can be readily made up by the standard diameters of balls that are obtainable. For instance, with a gage $\frac{3}{4}''$ diameter and annular spaces that can be made up with balls from $\frac{1}{8}$th rising by sixteenths up to $1''$, all sizes from $1''$ up to $2\frac{3}{4}''$ rising in eighths can be accurately measured, and further for the sake of cheapness and lightness, the larger sizes of balls can be dispensed with and two or more balls superimposed upon one another in a direct radial line to make up any required annular space and so get at any required diameter. The plug gage used in the center may be tapered to any required extent and the diameter may be accurately read according to the depth that the taper plug is entered by any suitable means.

Figure 2:
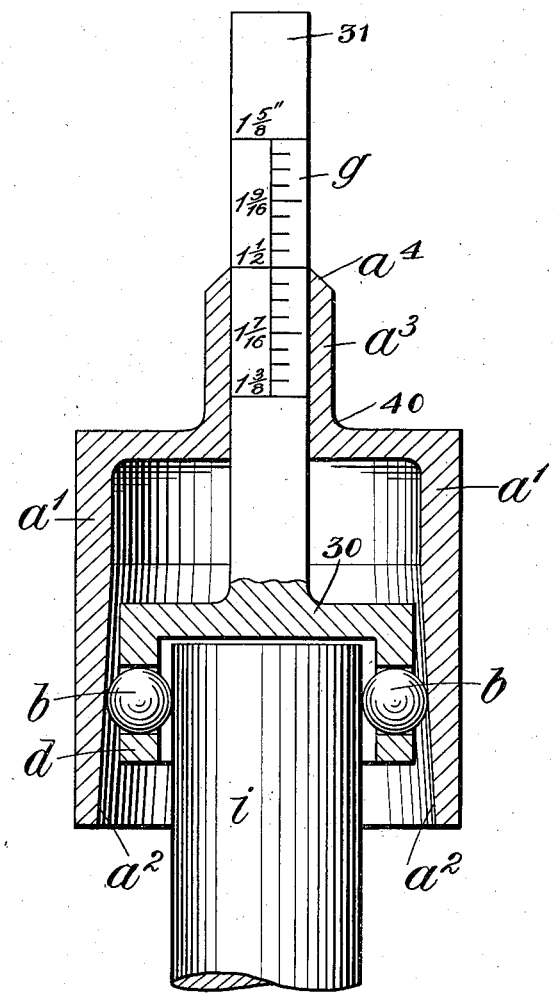

In the accompanying sheet of illustrative drawings:—Figure 1 is a transverse section of a gage embodying one form of this invention and in which a taper plug is employed instead of one of standard diameter this enabling the gage to be employed for various diameters within its limits. Fig. 2 is a similar view of gage embodying another form of its invention, adapted for gaging outside diameters also arranged to give graduated measurements.

An apparatus embodying this invention comprises a sleeve member provided with radial holes or pockets open at both ends, at one end to the interior of the sleeve and at the other end to the exterior thereof; a locking member having longitudinal inclines, balls free in said pockets and adapted to engage said inclines and the object to be measured; and a scale adapted to indicate or register the diameter of said object when the axial movement one within the other is arrested by a stop contact of said balls between the object and the inclines.

The diameter gage illustrated in Fig. 1 is designed for gaging internal diameters. In this case a sleeve member 10 is provided preferably near its lower end with a plurality of radial holes or pockets $d$, preferably three in number, extending through the wall of the sleeve and open at one end to the interior thereof and at the other end to the exterior thereof. Balls $b$ are free to roll in said pockets. These balls are larger in diameter than the thickness of the sleeve, whereby their peripheries are made to project outward beyond the outer circumference of the sleeve and inward into the bore. In this case the locking member 20 is in the form of a plug or rod adapted to slide longitudinally within the sleeve 10 and provided at its lower end with inclines preferably in the form of a tapered conical extension $a$. This sliding plug is also provided with a scale 21 the graduations of which are adapted to register with the top of said sleeve which is preferably tapered to a thin edge. In the use of this device the sliding plug 20 constituting the locking member is inserted in the sleeve 10 until the small end thereof is opposite the pockets of said sleeve. Then the spherical balls $b$ are inserted in the sleeve pockets $d$, their inner peripheries resting against said tapered plug. The pocket end of the sleeve is inserted into the bore $c$ of the cylinder, pipe or other object whose diameter is to be measured. Then the plug 20 is pushed inward until the tapering extension $a$ thereof forces the balls $b$ outward into locking or stop contact with the surface of said bore. The graduation of the scale 21 which then registers with the top 11 of the sleeve 10 indicates the diameter of the bore, the graduations and numerals of this scale being so arranged with relation to the plug, holes and the top of the sleeve as to secure this result. Then the plug 20 is withdrawn or partially withdrawn and the balls are free to roll toward the center out of contact with the bore. The sleeve 10 being smaller in diameter than the hole to be measured and the balls $b$ being free to roll inward toward the center when the tapered plug is partially withdrawn, the instrument can be freely applied to and withdrawn from the object to be measured and as the balls have a rolling contact, there is no appreciable wear thereon and consequently no practical diminution in the accuracy of the instrument under long periods of use. When the sleeve member of either form of this diameter gage is provided with three pockets and three balls are used therein, the instrument is self-centering when applied to the object to be gaged.

Many variations of diameter may be measured with a single instrument for instance, supposing, as shown, in two inches of the taper there is a difference in diameter of $\frac{1}{4}''$ the hole to be measured could be anything from $1\frac{3}{8}$th to $1\frac{5}{8}$th the middle position being $1\frac{1}{2}''$ as shown and the balls employed of $\frac{1}{2}''$ diameter. The upper parallel part of the plug gage 20 is as shown divided off for a distance corresponding with the length of the taper portion $a$ into 16 parts each part representing one 64th part of an inch between the limits ($1\frac{3}{8}$th$''$ to $1\frac{5}{8}$th$''$) of the gage. Of course any other taper could be made on the plug $a$ say on $1''$ long it could be tapered .001 of an inch and if $1''$ of the length of the plug be marked in tenths of an inch, each tenth part on the indicator would represent .0001 in the diameter of the hole being measured.

In Fig. 2 of the drawings a gage of the same general dimensions is shown for measuring outside diameters, the main principle being substantially the same as in the embodiment hereinbefore described. In this case the locking member 40 comprises an inverted cup $a'$ having interior inclines $a^2$ preferably in the form of a flaring cylinder, and a tubular neck $a^3$ of smaller diameter than said cup and projecting upward therefrom. This neck has preferably a beveled edge $a^4$. In this case the sleeve member comprises a shallow inverted cup 30 provided with an upwardly projecting stem 31 adapted to slide in the tubular neck $a^3$ of the locking member 40. The cup 30 has a straight interior bore and is of smaller diameter than the flaring cup $a'$ of the locking member 40. Said cup 30 is provided with ball pockets $d$ like the ball pockets of the sleeve member in Fig. 1. The stem 31 is provided with a scale $g$ with indexed graduations adapted to register with the tapered end $a^4$ of the tubular neck $a^3$. In the use of this instrument, the object $i$ for instance whose external diameter is to be measured, is inserted in the cylindrical cup 30 constituting the body of the sleeve member, the balls $b$ are inserted in the pockets $d$ of said cup 30 and then the stem 31 of said cup is inserted through the flaring cup $a'$ of the locking member 40 into the neck $a^3$ of said member and the cup 30 of the sleeve member is drawn into said cup $a'$ until the balls $b$ come into stop contact with the interior inclines $a^2$ of said flaring cup $a'$. At this point the scale $g$ will indicate at the joint of its register with the tapered neck $a^4$, the diameter of the object $i$.

If a set of balls be damaged they can readily be replaced by new standard balls, and if the plug be damaged or worn a very small gage only has to be replaced instead of one equal to the diameter of the hole. Also, due to the great ease of handling such an instrument, but little wear takes place on the measuring parts. A series of two or more planes with balls in the annular space may be combined to make a long gage.

By having two radial lines diverging from the measuring gage in a direction diametrically opposite, this instrument may be used for measuring the distance between two given points, the space on either side of the measuring plug being occupied by balls.

From the foregoing, various modifications of my improved instrument will be apparent without departing from the nature of the invention.

What I claim and desire to secure by Letters Patent of the United States is:—

1. The combination of a sleeve member provided with radial pockets open at both ends, a locking member having longitudinal inclines, one of said members being movable axially within the other and balls movable in said pockets, each having a diameter greater than the length of its pocket and adapted for rolling contact on one side of said sleeve member with said inclines and on the other side thereof with the object to be gaged, one of said members being provided with a scale adapted to register the diameter of said object when the relative movement of said members is arrested by stop contact of said balls with said inclines and said object.

2. The combination of a sleeve member provided with radial pockets open at both ends, balls movable in said pockets, each having a diameter greater than the length of its pocket, and a locking member in the form of a tapered plug slidable in said sleeve member between said balls and operative to force them outward into rolling contact with the object to be measured, one of said members being provided with a scale operative to indicate the internal diameter of said object when said tapered plug forces said balls into stop contact therewith.

3. The combination of a sleeve member provided with three radial pockets open at both ends, a locking member having longitudinal inclines, one of said members being movable axially within the other, and balls movable in said pockets, each having a diameter greater than the length of its pocket and adapted for rolling contact on one side of said sleeve member with said inclines and on the other side thereof with the object to be gaged, one of said members being provided with a scale adapted to register the diameter of said object when the relative movement of said members is arrested by stop contact of said balls with said inclines and said object.

4. The combination of a sleeve member provided with three radial pockets open at both ends, balls movable in said pockets, each having a diameter greater than the length of its pocket, and a locking member in the form of a tapered plug slidable in said sleeve member between said balls and operative to force them outward into rolling contact with the object to be measured, one of said members being provided with a scale operative to indicate the internal diameter of said object when said tapered plug forces said balls into stop contact therewith.

5. The combination of a sleeve member provided with radial pockets open at both ends, balls movable in said pockets, each having a diameter greater than the length of its pocket, and a locking member in the form of a tapered plug slidable in said sleeve between said balls and operative to force them outward into rolling contact with the object to be measured, one of said members being provided with a scale operative to indicate the internal diameter of said object when said tapered plug forces said balls into stop contact therewith.

In testimony whereof, I have hereunto subscribed my name.

W. BRUCE MAIR.

Witnesses:
ALFRED NUTTING,
C. P. LIDDON.